United States Patent [19]

Audureau et al.

[11] Patent Number: 5,591,410
[45] Date of Patent: Jan. 7, 1997

[54] PROCESS FOR THE ON-LINE GRAFTING OF CARBOXYLIC ACID AND CARBOXYLIC ACID ANHYDRIDES CONTAINING AN ETHYLENIC UNSATURATION ONTO ETHYLENE HOMOPOLYMERS OR COPOLYMERS AND INSTALLATION FOR THE IMPLEMENTATION OF THIS PROCESS

[75] Inventors: Joël Audureau, Noeux-les-Mines; Hacene Mehalla, Essars; Thierry Pellerin, Lens, all of France

[73] Assignee: ECP-Enichem Polymeres France S.A., Courbevoie, France

[21] Appl. No.: 478,849

[22] Filed: Jun. 7, 1995

Related U.S. Application Data

[62] Division of Ser. No. 371,575, Jan. 12, 1995, which is a continuation of Ser. No. 925,923, Aug. 7, 1992, abandoned.

[30] Foreign Application Priority Data

Aug. 14, 1991 [FR] France ..................... 91 10327

[51] Int. Cl.⁶ ..................... C08F 255/02
[52] U.S. Cl. ..................... 422/131; 422/133
[58] Field of Search ..................... 422/131, 133

[56] References Cited

U.S. PATENT DOCUMENTS

| | | |
|---|---|---|
| 3,928,497 | 12/1975 | Ohmori et al. . |
| 4,342,853 | 8/1982 | Durand et al. ............ 526/68 |
| 4,612,155 | 9/1986 | Wong et al. . |
| 4,650,841 | 3/1987 | Levresse ............ 526/68 |
| 4,762,882 | 8/1988 | Okano et al. ............ 525/74 |
| 4,788,264 | 11/1988 | Ukita ............ 525/285 |
| 4,804,725 | 2/1989 | Kanne et al. . |

FOREIGN PATENT DOCUMENTS

| | | |
|---|---|---|
| 1161196 | 1/1984 | Canada . |
| 0083521 | 7/1983 | European Pat. Off. . |
| 0116797 | 8/1984 | European Pat. Off. . |
| 0160984 | 11/1985 | European Pat. Off. . |
| 0231699 | 8/1987 | European Pat. Off. . |
| 0266994 | 5/1988 | European Pat. Off. . |
| 0272512 | 6/1988 | European Pat. Off. . |
| 117077 | 12/1975 | Germany . |

Primary Examiner—David W. Wu
Attorney, Agent, or Firm— Finnegan, Henderson, Farabow, Garrett & Dunner, L.L.P.

[57] ABSTRACT

(I) The (co)polymerisation of ethylene is carried out in at least one reaction zone (R) under high pressure, at 150°–320° C.; (II) the reaction product is routed into a zone (S), under an intermediate pressure P, for separation of the (co)polymer, in the molten state, from the unreacted (co)monomer(s), or the reaction product is routed into a first separation zone (S1), under an intermediate pressure (P1); the (co)polymer issuing from (S1) is then routed into a second separation zone (S2), under a pressure P2<P1; (III) the (co)polymer is routed into a zone (SF), under low pressure, for final separation of the (co)polymer from the residual gases. Let-down zones (D), (D1) and (D2) are provided along the path of the (co)polymer between the zones (S) and (SF), (S1) and (S2), and (S2) and (SF) respectively, the grafting monomer or monomers being introduced on-line, in the path of the (co)polymer, at at least one point located at the level of the zone (D) or at at least one zone (D1, D2). A grafting initiator may be introduced on-line at the same time as the grafting monomer(s) flow, or separately.

17 Claims, 2 Drawing Sheets

PROCESS FOR THE ON-LINE GRAFTING OF CARBOXYLIC ACID AND CARBOXYLIC ACID ANHYDRIDES CONTAINING AN ETHYLENIC UNSATURATION ONTO ETHYLENE HOMOPOLYMERS OR COPOLYMERS AND INSTALLATION FOR THE IMPLEMENTATION OF THIS PROCESS

CROSS-REFERENCE TO RELATED APPLICATIONS

This is a divisional of application Ser. No. 08/371,575 filed Jan. 12, 1995, which is a continuation of application Ser. No. 07/925,923 filed Aug. 7, 1992, abandoned.

The present invention relates to a process for grafting monomers chosen from carboxylic acids containing an ethylenic unsaturation, the corresponding acid anhydrides and derivatives of these acids and acid anhydrides onto ethylene homopolymers or copolymers. This process has the feature that the grafting monomers are injected on-line into the continuous production of the ethylene homopolymer or copolymer, more specifically between the polymerisation reactor outlet and the polymer extrusion device upstream of the granulating device. The invention also relates to an installation for the implementation of this process.

True homopolymers and copolymers of ethylene copolymerised with the monomers indicated above are well-known; they are used, in particular, in the production of adhesives, as coatings or in the form of mixtures with other polymers, for example polyolefins.

For some applications, however, it is desirable to have available a graft copolymer rather than a true copolymer. In fact, it is known that the properties of polyolefins may be modified by the grafting of a carboxylic acid or carboxylic acid anhydride containing an ethylenic unsaturation. One process for grafting unsaturated monomers onto ethylene homopolymers and copolymers of ethylene and higher $C_4$–$C_{10}$ α-olefins is described, for example, in U.S. Pat. No. 4,612,155; thus, in the case of the production of adhesives, for an identical content of monomers of the carboxylic acid or carboxylic acid anhydride type, the adhesiveness is better, at least in the case of relatively low contents.

The use of ethylene copolymers, grafted with a carboxylic acid or carboxylic acid anhydride containing an ethylenic unsaturation, in laminated films has also been disclosed, for example in European Patent Application EP-A-0 160 984, the ethylene copolymer in this case being an ethylene/alkyl acrylate copolymer.

In general, it is important when grafting monomers onto polymers to obtain a homogeneous product. If the grafting process is not conducted in a homogeneous manner, the resulting product may display variable and unacceptable properties, in particular with regard to adherence to other materials. Moreover, it is important to be able to graft monomers onto polymers without giving rise to major changes in the physical properties of the polymers.

In order to meet this aim, it has been proposed, according to European Patent Application EP-A-0 266 994, to graft dicarboxylic acids or dicarboxylic acid anhydrides containing an ethylenic unsaturation, or their derivatives, onto a copolymer of ethylene with at least one monomer chosen from vinyl alkanoates, alkyl (meth)acrylates, (meth)acrylic acid and carbon monoxide; or onto an ionomer of such a copolymer containing (meth)acrylic acid, this process consisting, in general, in:

(i) forming a mixture of the copolymer, the monomer and 25–3000 ppm of an organic peroxide having a half-life of about 1–120 minutes at 150° C. and mixing so as to obtain a uniform distribution of the monomer and of the peroxide in the copolymer;

(ii) malaxating the resulting mixture in an extruder at a temperature higher than the melting point of the said copolymer for a period of time which is at least four times the half-life of the organic peroxide; and (iii) extruding the resulting graft copolymer to give a shaped article, generally consisting of pellets or other finely divided forms, which may be used as such or as a mixture with other polymers, in particular in the form of adhesive compositions intended for use with polymers and/or metals, in the coextrusion of multilayer structures, in coating compositions, as compatibilising agents, in filled compositions and to improve the capacity of the polymers for accepting a colouring and a dye.

However, grafting of this type in an extruder has the disadvantages that it is necessary to recover a polymer in granule form in order to remelt it, which represents a loss of energy, and that, during said recovery of granules, the mixture of the molten granules and the graft monomer takes place in the presence of oxygen, which gives rise to a risk of crosslinking of the graft copolymer.

In RDA Patent No. 117 077 it is indicated that a grafting reaction conducted in a device mounted immediately downstream of the reactor (moderate-pressure separator or, low-pressure separator) is disadvantageous because a large amount of homopolymer or copolymer of the grafting component forms, and that it is not possible to prepare copolymers having a high grafted side chain content. In order to overcome this disadvantage, it is proposed, according to said patent, to introduce the grafting monomer either in a second zone of the polymerisation reactor or in a high- or low-pressure receiver of the polymerisation unit, for example a stirred reactor or an extraction machine. However, it is indicated that this second possibility is not worthwhile if grafting monomers are used which, during grafting conducted in the polymerisation reactor, would load the recycling gas and necessitate an expensive purification of the recycling gas. These monomers are maleimide, vinyl acetate or ethyl acrylate. It is recommended to introduce maleic anhydride, which does not form part of this list, into the second zone of the polymerisation reactor. This is confirmed by Example 4, which describes the production of an ethylene/vinyl acetate copolymer grafted with maleic anhydride. However, the reported maleic anhydride content of 6.8% by weight probably does not relate solely to the grafts, some of the maleic anhydride being copolymerised in the form of a true copolymer with ethylene and vinyl acetate.

To sumarise, the injection of the grafting monomer into the reactor leads in part to a true, undesired, copolymerisation of the said monomer and injection downstream of the reactor is not recommended for maleic anhydride as grafting monomer.

The Filing Company has sought to develop a process which does not have the abovementioned disadvantages of the prior-art techniques and which has the complementary advantage of being able to omit the use of devices using moving mechanical parts, such as the stirrers of stirred reactors or extruder screws.

To this end, it is proposed, according to the invention, in a process for the polymerisation or copolymerisation of ethylene under high pressure, comprising at least two separation stages downstream of the polymerisation reactor, to introduce the grafting monomer or monomers, on-line, at the level of the let-down zone, or of at least one let-down zone, present in the installation. Thus, in the case where said installation comprises a moderate-pressure separator and a low-pressure separator and where the injection of the grafting monomer or monomers is effected at the level of the let-down zone located between the two, it is apparent that, at the inlet of the low-pressure separator, the (co)polymer still contains about 10–15% of ethylene and, where appropriate, unreacted comonomer(s) but that, surprisingly, despite the presence of this high content of starting monomer(s), there is no ethylene/grafting monomer copolymerisation at the inlet of the let-down valve of the moderate-pressure separator.

Compared with grafting carried out in an extruder, the process of the present invention has an economic advantage because of the absence of an operation for recovery of a granulated polymer for remelting, which gives rise to an energy gain, and a technical advantage because the on-line mixture is free from oxygen, which eliminates the risk of crosslinking of the copolymer.

The present invention therefore relates to a process for the continuous production of an ethylene homopolymer or of a copolymer of ethylene and at least one monomer A, the said homopolymer or copolymer being modified by the grafting of at least one monomer B chosen from carboxylic acids containing an ethylenic unsaturation, their anhydrides and other derivatives, characterised in that:

in a first step, the polymerisation of ethylene or the true copolymerisation of ethylene and the monomer(s) A is carried out in the presence of at least one true (co)polymerisation initiator and, where appropriate, the customary additives, in at least one reaction zone (R) which is maintained under high pressure HP, at a temperature of between 150° and 320° C.;

in a second step,
either the reaction product is routed into a separation zone (S), maintained under an intermediate pressure P, in which the (co)polymer formed is separated, in the molten state, from the unreacted (co)monomer(s);

or the reaction product is routed into a first separation zone (S1), which is maintained under an intermediate pressure P1, in which the (co)polymer formed is separated, in the molten state, from the unreacted (co)monomer(s); then the (co)polymer obtained is routed into a second separation zone (S2), maintained under an intermediate pressure P2<P1, in which zone the (co)polymer in the molten state, issuing from zone (S1), is separated from the unreacted (co)monomer(s); and in a third step, the (co)polymer obtained is routed into a final separation zone (SF), maintained under a low pressure LP, in which zone the (co)polymer is separated from the residual gases, appropriate let-down zones (D), (D1) and (D2) being provided along the path of the (co)polymer between the zones (S) and (SF), (S1) and (S2), and (S2) and (SF) respectively, the monomer(s) B, if appropriate dissolved in a solvent or suspended in a dispersing medium, being introduced on-line, into the path of the (co)polymer, at at least one point located at the level of the let-down zone (D) or at at least one point located at the level of at least one let-down zone (D1, D2), grafting moreover being carried out, if necessary, in the presence of at least one appropriate initiator.

According to a preferred embodiment of the process of the present invention, the flow consisting of or comprising the monomer(s) B is injected upstream of the let-down zone in question (D; D1; D2), between the associated let-down point and the outlet of the separation zone located just upstream of the said let-down point. In the case where the let-down zone comprises a needle valve, the let-down point can be considered as corresponding to the region of the needle; for reasons of technical assembly, the inlet of the flow of grafting monomer(s) (B) will take place at least a short distance from the said needle.

According to another embodiment of the process according to the invention, the flow consisting of or comprising the monomer(s) B is injected downstream of the let-down zone in question (D; D1; D2), in the vicinity of the associated let-down point. The latter expression is understood to mean that the inlet of the flow of grafting monomer(s) takes place in a region relatively close to the let-down point in question.

According to the invention, the first step is advantageously carried out under a pressure HP of about 400 to 3000 bar, the second step under a pressure P of about 50 to 500 bar or under a pressure P1 of about 100 to 500 bar and then under a pressure P2 of about 10 to 70 bar, and the third step under a pressure LP of about 0.5 to 10 bar, on condition that the value of LP is lower than the value of P2.

Moreover, the second and the third steps are carried out at a temperature which is advantageously between 150° and 300° C.

According to the invention, the following are used, in particular, as monomer(s) A: a $C_3$–$C_{10}$ alpha-olefin, for example propylene, but-1-ene, 4-methylpent-1-ene, hex-1-ene or oct-1-ene, allowing the production of ethylene copolymers by the Ziegler route, or a vinyl alkanoate, such as vinyl acetate; a $C_1$–$C_{12}$ alkyl (meth)acrylate, such as ethyl acrylate, methyl acrylate, butyl acrylate or methyl methacrylate; (meth)acrylic acid; and carbon monoxide, allowing the production of polar ethylene copolymers by the free radical route.

The (co)polymerisation initiator is a free radical initiator, such as a peroxide, a perester or a hydroperoxide, in the free radical (co)polymerisation of ethylene; or a catalyst system of the Ziegler type comprising, in particular, at least one transition metal halide and an organometallic activator, in the case of the ionic (co)polymerisation of ethylene/α-olefin.

The following are advantageously used as monomer(s) B: (meth)acrylic acid, maleic acid, fumaric acid, itaconic acid, crotonic acid, itaconic anhydride, maleic anhydride or a substituted maleic anhydride, such as dimethylmaleic anhydride, or a salt, amide, imide or ester of a carboxylic acid containing an ethylenic unsaturation, such as monosodium and disodium maleate, acrylamide, maleimide and diethyl fumarate; maleic anhydride is used in particular.

Preferably, the monomer(s) B is or are introduced in the form of a solution in a solvent chosen from ethylene carbonate, propylene carbonate, diethyl carbonate and the esters of fatty acids and heavy alcohols, such as the butyl, hexyl and octyl acetates, or in the form of a dispersion in a dispersing medium, such as polyhexene or a polyolefin, in particular polyethylene, wax or fat, optionally with at least one solvent. The monomer(s) B/solvent weight ratio is advantageously between 0.5/1 and 1.5/1, preferably the highest possible concentration permitted by the solvent power of the solvent chosen and the temperature. The monomer(s) B/dispersing medium weight ratio is advantageously between 1/1 and 4/1. Moreover, the flow consisting of or comprising the monomer(s) B is heated so as to facilitate its on-line injection at a temperature which is adequate but below that which would give rise to the decomposition of the initiator which may be used conjointly.

It is possible to use a temperature of between, for example, 100° and 140° C. for said flow.

The following are advantageously used as grafting initiator: a peroxide and/or a perester, such as dicumyl peroxide or di-tert-butyl peroxide, tert-butyl perbenzoate or 2,5-dimethyl-2,5-(di-tert-butylperoxy)-hexane or a diazo compound.

The grafting initiator(s) is or are introduced into the flow of the monomer(s) B injected into the production line, and/or separately, also on-line, in particular upstream or advantageously downstream of the injection point or of at least the first injection point for the grafting monomer(s) B. In the latter case, these initiators are dissolved or dispersed in an appropriate medium, which may be a polymer medium.

According to the present invention it is also possible to carry out the grafting of at least one monomer B as defined above onto a copolymer of ethylene and at least one alpha-olefin, which copolymer is prepared in the presence of a catalyst system of the Ziegler type and modified by bringing the copolymer thus obtained into contact with at least one free radical initiator, in particular in an amount of 0.01 to 1 millimol per kg of the said copolymer. Free radical initiators of this type may be chosen from:

peroxy compounds such as peroxides (for example, di-tert-butyl peroxide), peresters and hydroperoxides;

benzopinacol;

diazo compounds, such as 2,2'-azo-bis(acyloxy-alkanes, such as 2,2'-azo-bis(acetoxybutane), 2,2'-azo-bis(acetoxyisobutane), 2,2'-azo-bis(propionoxypropane), 2,2'-azo-bis(2-acetoxy-4-methylpentane), or 1,1'-azo-bis(1-formyloxycyclohexane); and hydrocarbons possessing labile carbon-carbon bonds, such as, for example, diaryldialkylalkanes, such as 2,3-diphenyl-2,3-dimethylbutane (commonly known by the name biscumyl) or 3,4-diphenyl-3,4-dimethylhexane.

Details relating to said polymers modified in this way, the process for obtaining them, the choice of free radical initiators and the time for which the copolymer is brought into contact with the latter, etc., will be found in European Patent Applications EP-A-0 083 521 and EP-A-0 231 699, which are incorporated here by reference. The copolymers of ethylene and at least one α-olefin having from 3 to 12 carbon atoms, comprising 0.5 to 10 mol % of units derived from the said α-olefin and modified according to EP-A-0 083 521, are characterised in that their measured limiting viscosity is between 1.5 and 10 times their limiting viscosity calculated from the molecular mass distribution; with regard to the polymer compositions according to EP-A-0 231 699, these contain: a) from 90 to 99.8% by weight of at least one modified ethylene polymer and, where appropriate, at least one $C_3$–$C_{12}$ α-olefin, the said polymer containing at least 80 mol % of units derived from ethylene, and b) from 0.2 to 10% by weight of at least one polymer phase comprising at least one polymer containing at least 90 mol % of units derived from at least one $C_3$–$C_{12}$ α-olefin and at most 10 mol % of units derived from ethylene, the said compositions having a measured limiting viscosity of between 1.5 and 100 times their limiting viscosity calculated from the molecular mass distribution.

Moreover, the free radical initiator(s) introduced with a view to said modification may be in the form of a solution in a solvent or in the form of a suspension in a dispersing medium of the types indicated above, or in a polymer phase consisting, in particular, of ethylene and/or the polymerised comonomer A (by way of example, a polymer phase comprising at least 90 mol % of units derived from at least one $C_3$–$C_{12}$ α-olefin and at most 10 mol % of units derived from ethylene is described in EP-A-0 231 699).

Within the framework of the present invention, these initiators are introduced on-line, into the path of the (co)polymer, at at least one point located between the final reaction zone(s) of a multi-zone reactor, or in the final reactor of a reactor assembly connected in series, and the outlet of the conversion zone, which generally follows the final separation zone and in which an extrusion followed by a granulation of the intended (co)polymer are carried out. It is also possible to incorporate these free radical initiators by malaxating with the granules of the final graft (co)polymer.

Moreover, a grafting initiator(s)/monomer(s) B weight ratio which may be up to 1 and is preferably between 0 and 0.5 and an injected monomer(s) B content by weight of 0.05 to 2 parts per 100 parts of the copolymer, and preferably of 0.1 to 1.5 parts, are used.

According to the invention, the monomer(s) A is or are used in an amount of, in particular, from 0.1 to 90 mol % with respect to the sum of ethylene +monomer(s) A, for example 0.1 to 10 mol % during the production of the polar copolymers, and for example 2 to 90 mol % during the production of copolymers of ethylene and α-olefin(s).

The present invention also relates to an installation for the implementation of the process as defined above, characterised in that it comprises, in series:

at least one autoclave or tubular polymerisation reactor (R) under high pressure;

a separator (S) capable of operating under an intermediate pressure P, or two separators (S1; S2) in series, capable of operating under intermediate pressures P1 and P2 respectively, where P2<P1;

a low-pressure final separator (SF);

an extruder; and a granulating device, (co)polymer lines connecting the reactor (R) and the separators (S; S1; S2; SF), let-down valves, in particular needle valves, being arranged respectively on the outlets of the reactor (R) and the separators (S; S1; S2) separating the unreacted (co)monomer(s) from the (co)polymer formed; at least one line for injection of the flow consisting of or comprising the grafting monomer(s) B and, where appropriate, at least one grafting initiator opening into the line, in the let-down zone or a let-down zone containing the associated let-down valve; where appropriate, at least one line for the separate on-line injection of the grafting initiator(s), preferably downstream of the injection point, or of at least the first injection point, for the grafting monomer(s) B; where appropriate, at least one line for the separate on-line injection of at least one free radical initiator with a view to modification of an ethylene/-olefin copolymer prepared by Ziegler catalysis in the reaction zone, at at least one point located between the final reaction zone(s) of a multi-zone reactor or in the final reactor of a reactor assembly connected in series and the outlet of the granulating device; pumping means being provided on the line(s) for the injection of the grafting monomers(s) flow and on the line(s) for the separate injection, if this is provided, of the grafting initiator(s) and/or of the free radical initiator(s) with a view to the abovementioned modification.

The graft copolymers obtained in accordance with the present invention find application in particular for formulating injection moulding compositions, for forming films which can be used in the hygiene, agriculture and refrigeration sectors, etc.

In order better to illustrate the subject of the present invention, several illustrative embodiments will be described below, with reference to the appended drawings.

Figure 1:
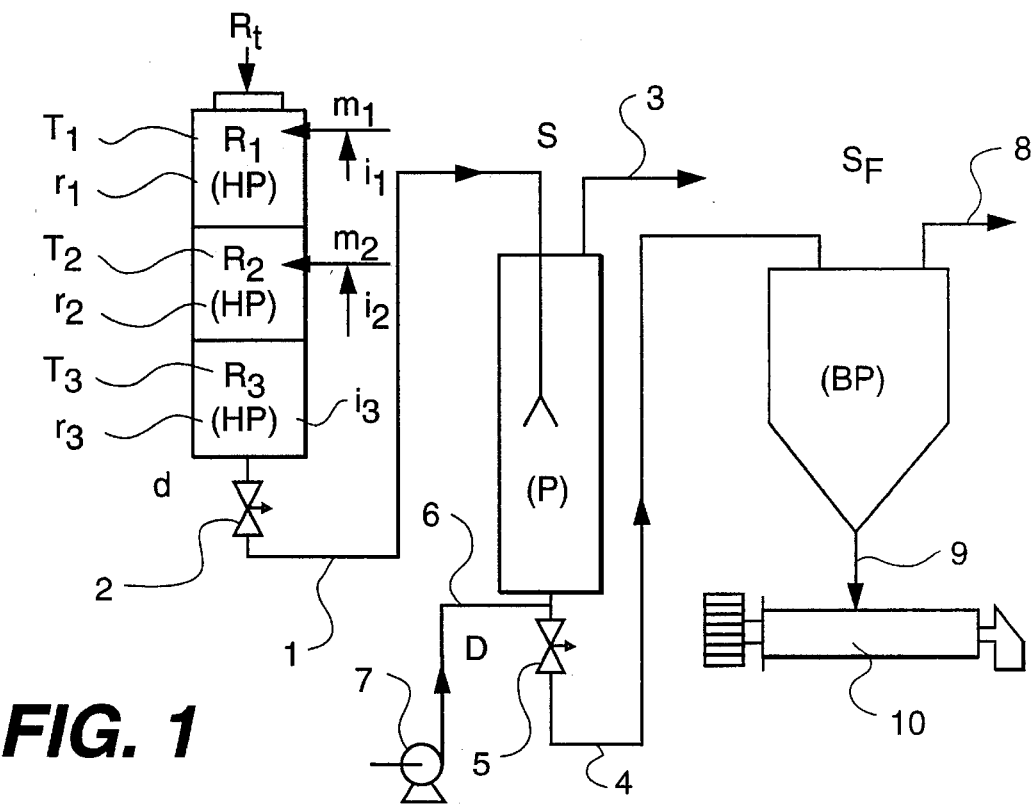
FIGS. 1 and 2 each show, schematically, an installation for the implementation of the process according to the present invention.

If reference is made to FIG. 1, it is seen that is represented a production unit for an ethylene graft polymer or copolymer.

The autoclave reactor in which the polymerisation of ethylene or the copolymerisation of ethylene with at least one monomer A takes place is denoted in its entirety by R; it consists of an elongated recipient, arranged vertically, assembled in three superimposed zones, which operates under high pressure HP. The first two zones R1 and R2 are provided with a concentric injector and the third zone R3 is provided with a simple injector. Temperature control is effected at three points r1, r2 and r3, the temperature being taken at points T1, T2 and T3. The gaseous ethylene/monomer(s) A mixture, containing, where appropriate, a transfer agent such as hydrogen, which is used in an amount of, in particular, up to 2% by volume, so as to control the fluidity index of the (co)polymer obtained, is injected at points t, m1 and m2. An appropriate polymerisation initiator is injected at i1, i2 and i3, in a manner known per se and so as to maintain the copolymerisation temperature at the chosen value.

The (co)polymer leaving the reaction zone R is fed, via a line 1, to a separation device S, consisting of a vertically arranged elongated vessel maintained under an intermediate pressure P, a let-down needle valve 2 being arranged on the line 1.

In the separator S the unreacted monomers are removed from the reaction mixture and these unreacted monomers leave the upper part via the line 3 and are recycled in a known manner, for example to the inlet of a hypercompressor mounted between the compressor which has to compress the feed charge and the reactor R, as described in Canadian Patent CA-A-1 161 196.

Figure 3:
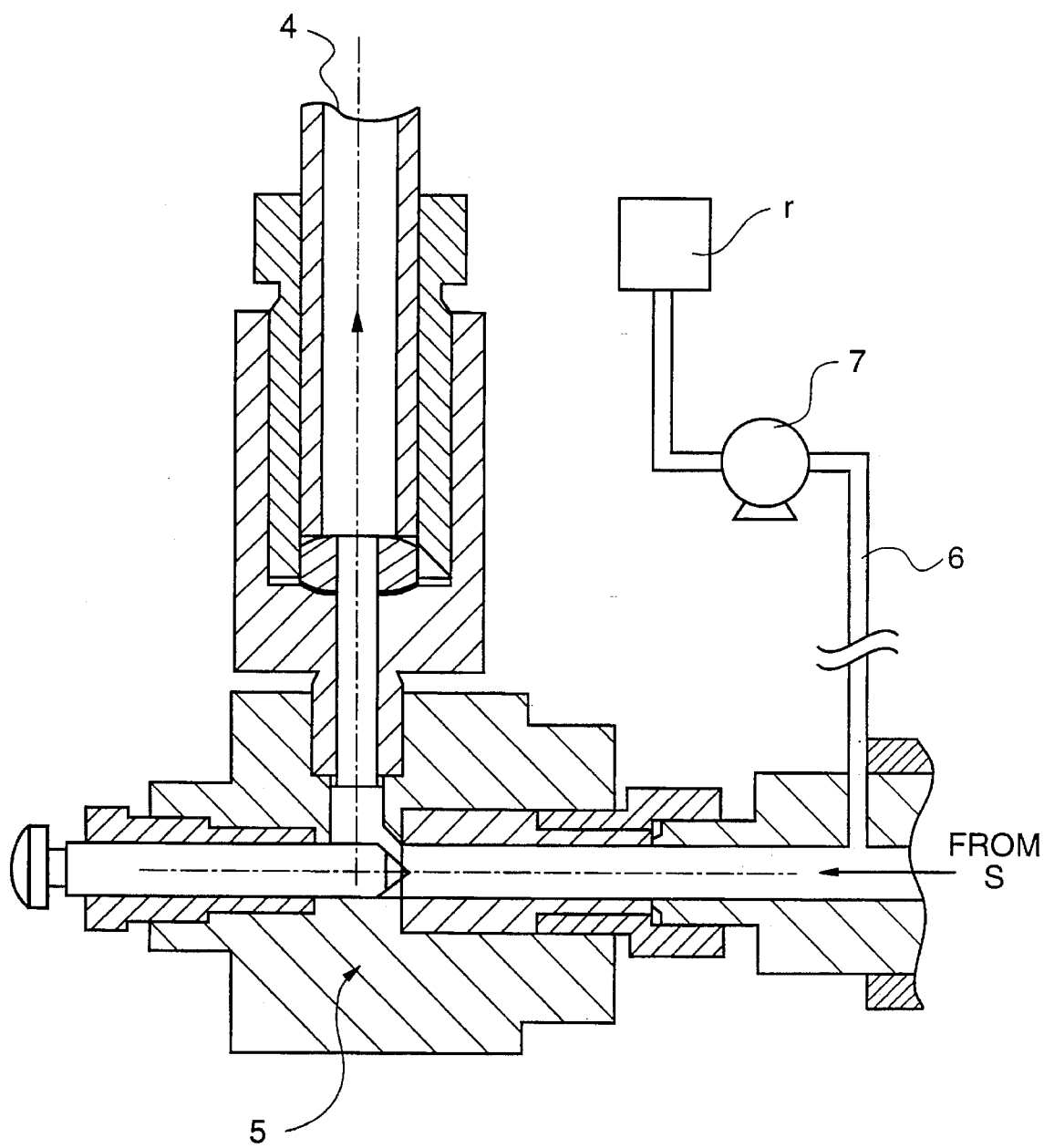
FIG. 3 is a diagram of a needle valve for effecting each let-down in the abovementioned installations, showing a possible assembly of the line for the injection of the grafting monomer(s).

In the same way as above, the flow rich in (co)polymer leaving the separation zone S is fed, via a line 4, to the final separation device SF, which is of a hopper type and operates under a low pressure LP. A let-down needle valve 5 is also inserted in line 4. The injection, via the line 6, of a solution contained in a reservoir r, which advantageously is heated, of grafting monomer(s) B/grafting initiator/solvent, via a high-pressure pump 7 (FIG. 3) is provided at a point located upstream of the needle of said let-down valve 5. The pump chosen as pump 7 may be an alternating metering pump with continuous flow control, or a geared pump.

The residual gases leaving via the line 8 of the low-pressure hopper SF may be recycled by being fed to the compressor (not shown); with regard to the mixture 9, this is fed to a screw extruder, which it leaves in the form of a rod, which is then fed, in known manner, to a granulating device, which is not shown.

EXAMPLES 1 TO 21

General operating method:

The installation shown in FIG. 1 was used.

The operating conditions were as follows:

pressure HP of the reactor R: that indicated in Table 1;

monomer injection: as indicated in the above description of the installation with the following distribution:
t: 1/3; m1: 1/3; m2: 1/3, injection of the initiator, consisting of tert-butyl peroctanoate for Examples 1 to 17, di-tert-butyl peroxide for Examples 18 to 20 and a mixture of tert-butyl perbenzoate (60%) and tert-butyl perneodecanoate (40%) for Example 21: as indicated in the above description of the installation, with the following distribution:
i1: 60%; i2: 20%; i3: 20%, temperature profile:
T1: 250° C. (Examples 18 to 20) or 170° C. (other examples)
T2: 260° C. (Examples 18 to 20) or 190° C. (other examples); and
T3: 275° C. (Examples 18 to 20) or 215° C. (other examples).

total flow rate of the gaseous monomers fed to the reactor: 200 kg/h;

percentage of monomer A as mol % with respect to the sum of ethylene+monomer A;

prevailing pressure in the separator S, P=250 bar.

A 250 g/l solution of maleic anhydride (monomer B) in propylene carbonate (Examples 1 to 11) or in diethyl carbonate (Examples 12 to 21) was injected via the line 6 at a flow rate so as to comply with the percentage by weight of maleic anhydride, injected with respect to the (co)polymer, indicated in Table 1. An initiator, also as indicated in Table 1, was present in the solution (except for Examples 1, 6, 12, 18 and 21). The initiator/maleic anhydride weight ratio is also indicated in Table 1.

Table 1 also indicates the monomer A content of the copolymer obtained (in % by weight), the fluidity index of the graft (co)polymer obtained, determined in accordance with the standard ASTM D1238, condition E, the amount of maleic anhydride grafted (expressed in ppm) and the degree of grafting.

The determination of the maleic anhydride grafted was carried out on the absorption at 1785 $cm^{-1}$ of the antisymmetric valency vibration of the carbonyl groups, taking as a basis a calibration carried out using ethylene/maleic anhydride copolymers and ethylene/n-butyl acrylate/maleic anhydride terpolymers produced by free radical copolymerisation. The propylene carbonate (or the diethyl carbonate) and the maleic anhydride and the other volatile materials were extracted with acetone for 24 hours; this determination by infrared spectroscopy was carried out on a film having a constant thickness of 50 μm. The degree of grafting represents the ratio of the amount of maleic anhydride grafted onto the (co)copolymer to the amount of maleic anhydride injected on-line, with respect to the same amount of (co)polymer.

TABLE 1

| Example | HP (bars) | Monomer A Nature | Monomer A mol % | initiator I | % by weight of maleic anhydride injected | Ratio by weight of initiator/ maleic anhydride | % by weight of monomer A in the final copolymer | FI (g/10 min) | Maleic anhydride grafted (ppm) | Degree of grafting |
|---|---|---|---|---|---|---|---|---|---|---|
| 1 | 2050 | BuA | 0.60 | — | 0.19 | 0 | 14.5 | 2.14 | 360 | 0.19 |
| 2 | " | " | 0.58 | 11 | 0.18 | 0.05 | 14 | 1.85 | 470 | 0.26 |
| 3 | " | " | 0.58 | 12 | 0.21 | 0.05 | 14 | 1.85 | 405 | 0.186 |
| 4 | " | " | 0.62 | 11 | 0.42 | 0.05 | 15 | 3.5 | 625 | 0.148 |
| 5 | " | " | 0.62 | 12 | 0.17 | 0.2 | 15 | 2.2 | 440 | 0.261 |
| 6 | " | " | 0.59 | — | 0.5 | 0 | 14.4 | 1.81 | 480 | 0.096 |
| 7 | " | " | 0.58 | 11 | 0.53 | 0.2 | 14 | 2.8 | 645 | 0.12 |
| 8 | " | " | 0.58 | 11 | 0.18 | 0.2 | 14 | 2.55 | 425 | 0.233 |
| 9 | " | " | 0.62 | 13 | 0.19 | 0.2 | 15 | 2.31 | 500 | 2.64 |
| 10 | " | " | 0.58 | 13 | 0.54 | 0.05 | 14 | 2.07 | 400 | 0.08 |
| 11 | " | " | 0.62 | 12 | 0.18 | 0.5 | 15 | 2.1 | 1000 | 0.55 |
| 12 | " | " | 0.63 | — | 0.46 | 0 | 15.3 | 2.2 | 780 | 0.17 |
| 13 | " | " | 0.63 | 12 | 0.4 | 0.5 | 15.3 | 1.8 | 1850 | 0.46 |
| 14 | 1960 | " | 0.60 | 14 | 0.5 | 0.05 | 14.7 | 1.4 | 1700 | 0.34 |
| 15 | " | " | 0.62 | 14 | 0.5 | 0.2 | 15.1 | 1.4 | 1900 | 0.38 |
| 16 | " | " | 0.62 | 14 | 0.5 | 0.5 | 15 | 1.8 | 2050 | 0.41 |
| 17 | 1600 | " | 0.42 | 14 | 1 | 0.2 | 10.1 | 5.5 | 4200 | 0.42 |
| 18* | 1500 | " | 0 | — | 0.4 | 0 | 0 | 8 | 2100 | 0.53 |
| 19* | " | — | 0 | 14 | 0.4 | 0.05 | 0 | 8 | 2200 | 0.55 |
| 20* | " | — | 0 | 14 | 0.4 | 0.5 | 0 | 8 | 2400 | 0.60 |
| 21 | 1720 | VA | 1.45 | — | 0.4 | 0 | 5.1 | 2.3 | 1720 | 0.43 |

Figure 2:
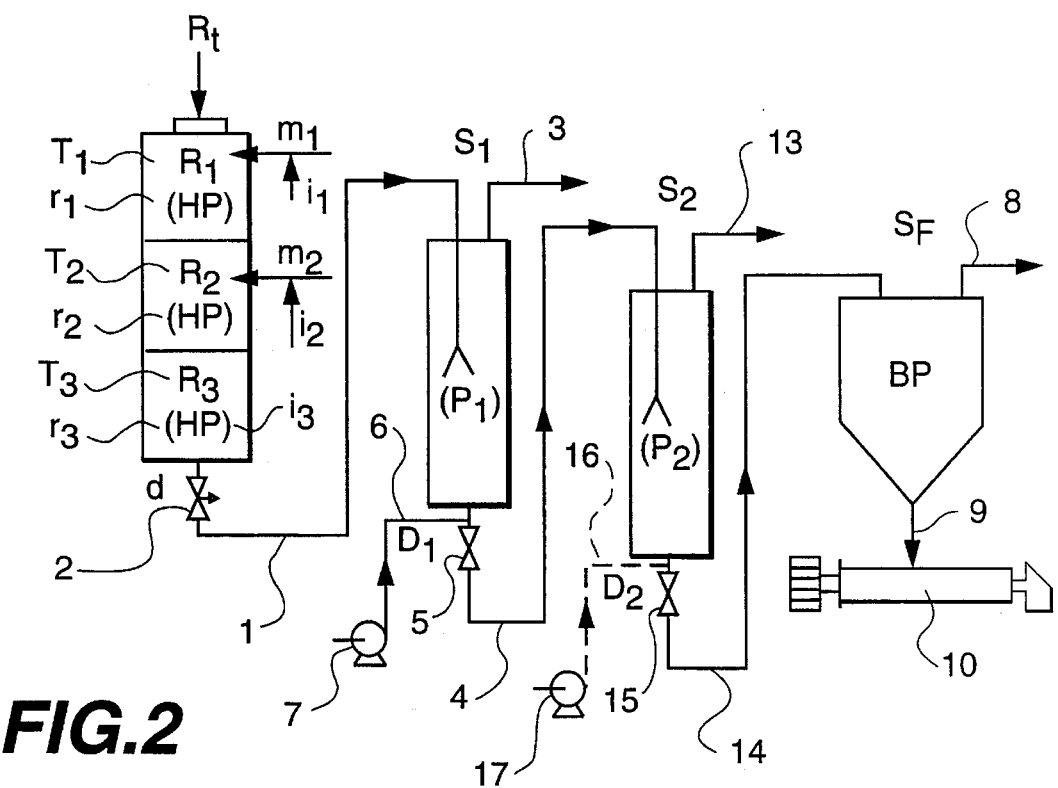

If reference is now made to FIG. 2, it can be seen that this shows an installation for the production of graft ethylene copolymers analogous to that in FIG. 1, except that it is provided with a second separation zone S2. The two intermediate separation zones S1 and S2 operate at, respectively, P1 and P2, P1 being higher than P2. The lines associated with the second separator S2 are denoted by reference numerals greater than 10.

It is possible to inject the monomer B+solvent+initiator mixture, or else just upstream of the needle of the valve 5, as shown by the solid line on FIG. 2. Similarly, it is also possible to inject the mixture based on monomer B via line 16, as shown by a broken line in FIG. 2. It is also possible to inject the mixture based on monomer B via line 16 only.

EXAMPLE 22

In the installation shown in FIG. 1, a gaseous mixture comprising 50% by weight of ethylene and 50% by weight of but-1-ene, introduced into the reactor R at point t, was copolymerised continuously. 0.03% by volume of hydrogen with respect to the gaseous mixture was also introduced at the same point.

The copolymerisation catalyst, comprising the co-ground compound $TiCl_3$, $1/3 AlCl_3$ and $2.5 MgCl_2$ in suspension in a $C_{10}-C_{12}$ saturated hydrocarbon cut, was introduced at point i1. It was activated by means of triethylaluminium using an Al/Ti ratio of 10.

The three zones of the reactor were kept at a temperature of 250° C. under a pressure of 800 bar.

The separator S was kept under a pressure of 250 bar; the low-pressure hopper SF was kept under a pressure of 10 bar.

A solution containing, per liter, 250 g of maleic anhydride and 50 g of 2,2-azo-bis(acetoxypropane) in diethyl carbonate was introduced via line (6) by means of the pump (7). The flow rate of this solution was such that 0.15 g of maleic anhydride were introduced per 100 g of copolymer originating from the separator S. The residual gases issuing from the low-pressure hopper SF were not recycled into the polymerisation installation.

A copolymer of ethylene and but-1-ene grafted with 0.05% by weight of maleic anhydride and having a density of 0.923 and a fluidity index FI (determined in accordance with the standard ASTM D-1238, condition L) of 3.7 g/10 min was obtained.

By way of comparison, if the solution of maleic anhydride and initiator is not introduced, a copolymer of ethylene and but-1-ene which has the same density and an FI of 4.5 g/10 min is obtained.

We claim:

1. An apparatus for the continuous production of an ethylene homopolymer, or of a copolymer of ethylene and at least one comonomer A, the homopolymer or copolymer being modified by grafting thereto at least one monomer B selected from carboxylic acids containing an ethylenic unsaturation, their anhydrides, and derivatives thereof, said apparatus comprising, in series:

at least one autoclave or tubular polymerization reactor (R) under high pressure;

a separator (S) capable of operating under an intermediate pressure P, or two separators (S1 and S2) in series, capable of operating under intermediate pressures P1 and P2 respectively, where P2<P1;

a low-pressure final separator (SF);

an extruder; and a granulating device;

said apparatus having:

(co)polymer lines connecting said reactor (R) and said separators (S or S1 and S2, and SF);

let-down valves arranged on the outlets of said reactor (R) and said separators (S or S1 and S2), separating unreacted (co)monomer(s) from said (co)polymer formed;

at least one line for injection of the flow comprising said at least one grafting monomer B upstream of a let-down zone or a let-down zone containing the associated let-down valve;

pumping means being provided on the line(s) for the injection of the flow of said at least one grafting monomer flow.

2. The apparatus according to claim 1, further comprising, in addition to said at least one line for injection of the flow comprising said at least one grafting monomer B, at least one grafting initiator opening into the line upstream of a let-down zone or a let-down zone containing the associated let-down valve.

3. The apparatus according to claim 1, further comprising at least one line for the separate on-line injection of at least one free radical initiator to be used in the modification of an ethylene/α-olefin copolymer prepared by Ziegler catalysis in the reaction zone, at at least one point located in the final reactor of a reactor assembly connected in series and the outlet of the granulating device.

4. The apparatus according to claim 1, wherein a pumping means is also provided on said line(s) for the separate injection of the grafting initiator(s) and/or of the free radical initiator(s).

5. The apparatus according to claim 1, wherein said letdown valves are needle valves.

6. An apparatus for the continuous production of an ethylene homopolymer, or of a copolymer of ethylene and at least one comonomer A, the homopolymer or copolymer being modified by grafting thereto at least one monomer B selected from carboxylic acids containing an ethylenic unsaturation, their anhydrides and derivatives thereof, said apparatus comprising, in series:

a multizone reactor (R) or a reactor assembly, under a high pressure HP, adapted for polymerizing ethylene, or copolymerizing ethylene and at least one comonomer A, in the a separator (S) capable of operating under an intermediate pressure P and adapted for separating the polymer or copolymer formed, in the molten state, from the unreacted monomer or comonomers;

a low-pressure final separator (SF), adapted for separating the polymer or copolymer from the residual gases;

an extruder adapted for extruding the polymer or copolymer; and a granulating device, adapted for granulating the polymer or copolymer extruded;

said apparatus having:

(co)polymer lines connecting the final reaction zone of said multizone reactor (R) or the final reactor of said reactor assembly connected in series, said separator (S), said final separator (SF), said extruder and said granulating device;

letdown valves arranged on the outlets of the final reaction zone of said multizone reactor (R) or the final reactor of said reactor assembly, and of said separator (S);

wherein at least one line for injection of the flow comprising said at least one grafting monomer B opens into the path of the polymer or copolymer upstream of the letdown zone (D) provided along the path of the polymer or copolymer between said separator (S) and said final separator (SF) and containing the associated letdown valve, pumping means being provided on said line or lines for the injection of said grafting monomer flow.

7. The apparatus according to claim 6, wherein said multizone reactor (R) or said reactor assembly is of the autoclave or tubular type.

8. The apparatus according to claim 6, wherein said letdown valves are of the needle valve type.

9. The apparatus according to claim 6, wherein said at least one line opening into the path of the polymer or copolymer allows injection of the flow comprising said at least one grafting monomer B and at least one grafting initiator.

10. The apparatus according to claim 6, further comprising at least one line for the separate on-line injection of said at least one grafting initiator, adapted for introducing said at least one grafting initiator upstream of the introduction point, or of at least the first introduction point, of said at least one grafting monomer B, pumping means being provided on the line(s) for the separate injection of said at least one grafting initiator.

11. The apparatus according to claim 6, further comprising at least one line for the separate on-line injection of at least one free radical initiator to modify an ethylene/α-olefin copolymer prepared by Ziegler catalysis in the reaction zone, at at least one point located between the final reaction zone of the multizone reactor or the final reactor of a reactor assembly connected in series, and the outlet of said granulating device, pumping means being provided on the line(s) for the separate injection of said free radical initiator(s).

12. An apparatus for the continuous production of an ethylene homopolymer, or of a copolymer of ethylene and at least one comonomer A, the homopolymer or copolymer being modified by grafting thereto at least one monomer B selected from carboxylic acids containing an ethylenic unsaturation, their anhydrides and derivatives thereof, said apparatus comprising, in series:

a multizone reactor (R) or a reactor assembly, under a high pressure HP, adapted for polymerizing ethylene, or copolymerizing ethylene and at least one comonomer A, in the presence of at least one initiator;

two separators (S1 and S2) capable of operating under intermediate pressures P1 and P2 respectively, P2 being lower than P1, said separators being adapted for separating the polymer or copolymer formed, in the molten state, from the unreacted monomer or comonomers;

a low-pressure final separator (SF), adapted for separating the polymer or copolymer from the residual gases;

an extruder adapted for extruding the polymer or copolymer; and a granulating device, adapted for granulating the polymer or copolymer extruded;

said apparatus having:

(co)polymer lines connecting the final reaction zone of said multizone reactor (R) or the final reactor of said reactor assembly connected in series and said separator (S1), said separator (S2), said final separator (SF), said extruder and said granulating device;

letdown valves arranged on the outlets of the final reaction zone of said multizone reactor (R) or of the final reactor of said reactor assembly, of said separator (S1) and of said separator (S2);

wherein at least one line for injection of the flow comprising said at least one grafting monomer B opens into the path of the polymer or copolymer upstream of the letdown zone (D1) provided along the path of the polymer or copolymer between said separator (S1) and said separator (S2) containing the associated letdown valve, and/or at least one line for injection of the flow comprising said at least one grafting monomer B opens into the path of the polymer or copolymer at or proximate to the letdown zone (D2) provided along the path of polymer or copolymer between said separator (S2) and said final separator (SF) containing the associated letdown valve, pumping means being provided on said line or lines for the injection of said grafting monomer flow.

13. The apparatus according to claim 12, wherein said multizone reactor (R) or said reactor assembly is of the autoclave or tubular type.

14. The apparatus according to claim 12, wherein said letdown valves are of the needle valve type.

15. The apparatus according to claim 12, wherein said an least one line opening into the path of the polymer or copolymer allows injection of the flow comprising said at least one grafting monomer B and at least one grafting initiator.

16. The apparatus according to claim 12, further comprising at least one line for the separate on-line injection of said at least one grafting initiator, adapted for introducing said grafting initiator or initiators upstream of the introduction point, or of at least the first introduction point, of said at least one grafting monomer B, pumping means being provided on the line(s) for the separate injection of said at least one grafting initiator.

17. The apparatus according to claim 12, further comprising at least one line for the separate on-line injection of at least one free radical initiator to modify an ethylene/α-olefin copolymer prepared by Ziegler catalysis in the reaction zone, at at least one point located between the final reaction zone of the multizone reactor or the final reactor of a reactor assembly connected in series, and the outlet of said granulating device, pumping means being provided on the line(s) for the separate injection of said free radical initiator(s).

* * * * *

UNITED STATES PATENT AND TRADEMARK OFFICE
CERTIFICATE OF CORRECTION

PATENT NO. : 5,591,410
DATED : January 7, 1997
INVENTOR(S) : AUDUREAU et al.

It is certified that error appears in the above-indentified patent and that said Letters Patent is hereby corrected as shown below:

On title page, item [54] and col. 1, line 1, in

Title, line 2, change "ACID" to --ACIDS--.

Claim 6, col. 11, line 30, after "in the" insert --presence of at least one initiator; --.

Claim 12, col. 12, line 61, delete "at or proxi-"; and line 62, delete "mate to" and insert --upstream of--.

Claim 15, col. 13, line 6, change "an" to --at--.

Signed and Sealed this

Twenty-fifth Day of March, 1997

*Attest:*

BRUCE LEHMAN

*Attesting Officer*        *Commissioner of Patents and Trademarks*